Nov. 10, 1925.
G. T. COOKE
SAFETY LOCK
Filed March 24, 1925
1,561,218
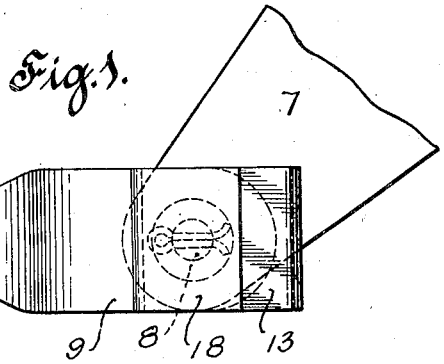
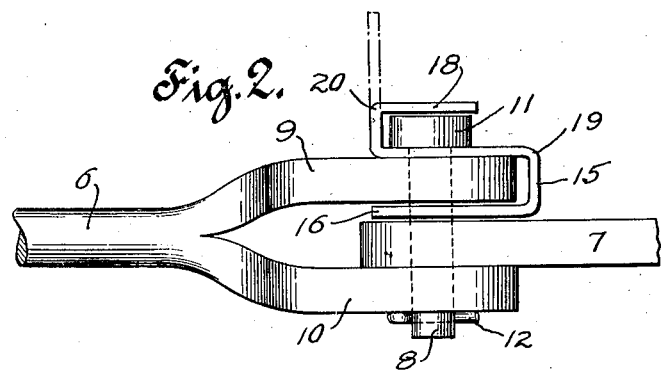
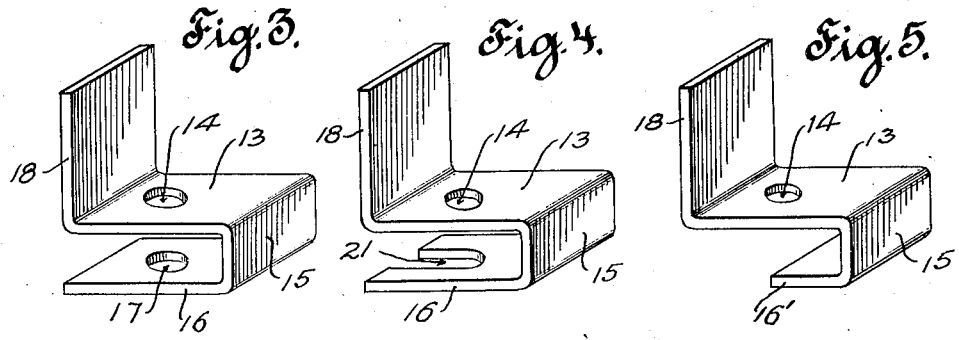
INVENTOR
George T. Cooke
BY
Mitchell & Buchet
ATTORNEYS Patented Nov. 10, 1925.

1,561,218

UNITED STATES PATENT OFFICE.

GEORGE T. COOKE, OF NEW YORK, N. Y.

SAFETY LOCK.

Application filed March 24, 1925. Serial No. 17,889.

*To all whom it may concern:*

Be it known that I, GEORGE T. COOKE, a citizen of the United States of America, residing at New York, N. Y., have invented a new and useful Safety Lock, of which the following is a specification.

My invention relates to a safety lock for pins, such as bolts and the like.

It is an object of the invention to provide a simple safety lock for pins and the like which will serve to prevent withdrawal of a pin connecting two or more members and which will be cheap to manufacture.

It is a further object to provide a safety pin lock in which two parts of the pin lock may engage the head of a pin directly.

Briefly stated, in the preferred form of the invention the pin lock is formed of a sheet metal plate having the central or main body portion apertured to receive a pin therethrough. Extending from the central portion is a rearwardly bent portion, and from the end of said rearwardly bent portion is an integrally formed tail portion extending substantially parallel to the central or body portion. If desired, this tail portion may also be apertured to receive the same pin which extends through the central portion. The distance between the central portion and the tail portion is preferably just sufficient to accommodate one of the members to be held by the pin. The forward end of the lock member is bent upwardly and adapted to be bent over the head of a pin, which head is thus secured directly between the main central portion and the bent-over forward end.

In the drawings which show, for illustrative purposes only, preferred forms of the invention—

Fig. 1 is a fragmentary view of two members pinned together and illustrating one form of the invention;

Fig. 2 is a view of the parts shown in Fig. 1 but taken at right angles thereto;

Fig. 3 is a perspective view of the safety lock shown in Figs. 1 and 2;

Figs. 4 and 5 are views similar to Fig. 3 but illustrating modifications.

In said drawings, 6 indicates one member to be secured to another member 7 by means of a bolt, pin or the like 8. In the preferred form shown the member 6 may be a connecting rod or lever of a railway brake mechanism, while 7 may be a lever or hanger for brake beams. In the form shown the lever 6 is provided with a forked end comprising legs 9—10 between which the end of the lever 7 fits. The members 7, 9 and 10 are apertured to receive the pin 8, which may have a head 11 at one end, and at the opposite end a cotter pin or the like 12 may be employed.

Now, if the cotter pin should fall out or become disengaged from the pin, there would ordinarily be nothing to prevent the pin from slipping out and permitting the levers 6, 7 to be disengaged from each other. The invention relates to means for preventing such falling out of the pin 8 in case the cotter pin should be removed.

In one form of the invention I employ a sheet metal plate having a central or main body portion 13 apertured as at 14 for receiving the pin 8. Extending rearwardly from the body portion 13 is an integral portion 15, and from the end of this integral portion is an inwardly extending tail portion 16, preferably lying substantially parallel to the main central portion 13. It is preferred that the space between the central portion 13 and the tail portion 16 shall be just sufficient to accommodate one of the members, as 9. When the tail portion extends inwardly a sufficient distance, as shown in Figs. 1, 2 and 3, a suitable aperture 17 would be provided therein for accommodating the pin. At the opposite end of the central body portion is a forwardly extending head portion 18.

Now, when the sheet metal safety lock is to be used, the form shown in Fig. 3 is first passed over the arm 9 with the tail portion 16 extending between the arms 9 and 7. The pin 8 is next passed through the apertures 14, 17 and the registering apertures in the levers. The head 11 then rests directly upon the central portion 13. The end 18 is next bent down, as shown in Figs. 1 and 2, so as to position the head directly on the main body portion 13 and directly between the same and the head portion 18. It is particularly advantageous to secure the head 11 directly between the parts 13 and 18, for the reason that, should force be applied to the pin 8 tending to remove the latter, before the pin could actually slip out the sheet metal member would first have to bend at the point 19, and further force tending to remove the pin would then tend to bend the part 18 at the point 20. This construction is therefore superior to the constructions with which I am familiar in which the pin lock is merely a U-shaped member one leg of which fits between the parts 7 and 9 and the other leg of the U extends out over the head of the pin.

The form shown in Fig. 4 is substantially like that shown in Fig. 3, except that the tail portion 16, instead of having a closed aperture, has an open aperture or slot 21 therein to accommodate the pin 8 and serve as a positioning means for the lock.

In the form shown in Fig. 5 the tail 16' does not extend inwardly as far as in the other two forms but may extend up substantially to the pin.

While the form shown in Figs. 4 and 5 may not, in all cases, be quite as safe as that shown in Fig. 3, it is to be observed that there is little likelihood of having the device fail because of the tail portion 16 or 16', since that tail portion is substantially supported between the parts 7 and 9.

While the invention has been described in some detail and in connection with a specific application, I do not wish to be strictly limited to the form shown nor to the specific application, since changes may be made within the scope of the invention as defined in the appended claim.

I claim:

In a device of the character described, a member forked at one end, another member extending intermediate the forked ends of the first-mentioned member, said members having registering apertures, a headed pin extending through said apertures for holding said members together, and a sheet metal safety locking device bent to embrace one forked end and extending between the forked end and the intermediate member and also extending under the head portion of said pin, a portion of said sheet metal device being bent over the outside of said head to hold the same in place.

GEORGE T. COOKE.